Figure 1:
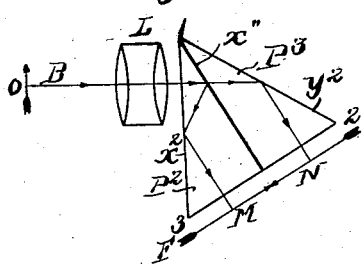

June 10, 1924.

D. F. COMSTOCK 1,497,357

METHOD AND SYSTEM FOR PRODUCING A PLURALITY OF IMAGES

Original Filed Feb. 9, 1916

Inventor;
Daniel F. Comstock,
by Roberts, Roberts & Cushman
his attys.

Patented June 10, 1924.

1,497,357

UNITED STATES PATENT OFFICE.

DANIEL F. COMSTOCK, OF CAMBRIDGE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

METHOD AND SYSTEM FOR PRODUCING A PLURALITY OF IMAGES.

Original application filed February 9, 1916, Serial No. 77,237. Divided and this application filed March 16, 1922. Serial No. 544,084.

*To all whom it may concern:*

Be it known that I, DANIEL F. COMSTOCK, a citizen of the United States of America, and resident of Cambridge, in the county of Middlesex and State of Massachusetts, have invented new and useful Improvements in Methods and Systems for Producing a Plurality of Images, of which the following is a specification.

In colored motion-picture projection it has heretofore been the commercial practice to project successively through color-screens film pictures taken successively through color-screens. The results obtained by this method have been open to two serious objections; first, the displacements in successive pictures of the moving objects cause those parts of the moving objects which do not coincide in the successive pictures to appear in the colors of the several color screens rather than in the natural colors which would result from the blending or fusion of the several colors; second, the eye is fatigued by the alternate bombardment of light of different colors. The first difficulty causes what are called "fringes" and is especially bad when rapidly moving objects are photographed. The second difficulty causes a feeling of eye strain which is distinctly objectionable.

To overcome this it is desirable to project simultaneously through different color-screens two or more photographs, taken through color-screens, of the same scene from accurately the same point of view at the same time. This involves the problem of obtaining on a film or films two or more photographs from accurately the same point of view, of the same scene at the same time.

According to the invention herein claimed a cinematographic film bearing a series of multiplex simultaneous images of the same object field is formed by dividing a beam of light from the object field, acting upon the beam either before or after it is divided to bring images of the object-field simultaneously into focus in the respective divisions of the beam in mutually reversed relationship to each other and on separate areas of the same side of the film, and successively exposing new areas of the film in the focal plane of each image, the film being advanced between successive exposures in any suitable manner as by the usual Geneva movement and sprocket wheel. In order conjointly to position the images on the film in uniform relationship it is important that the simultaneously formed images be adjacent to each other, preferably in juxtaposed picture spaces on the film.

Figure 5:
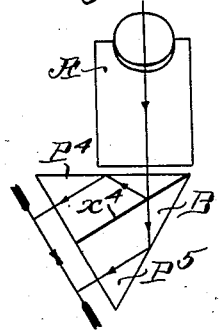
Figure 6:
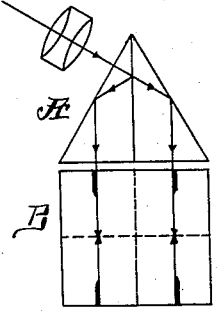
Figure 7:
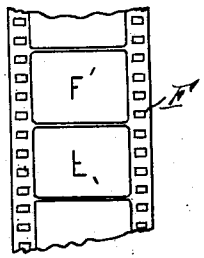
Figure 8:
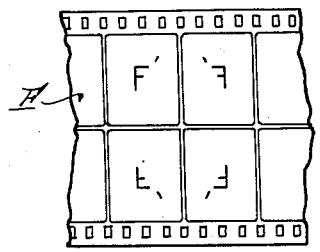

In the accompanying drawings, Figs. 1 to 6 inclusive illustrate diagrammatically several possible optical systems for obtaining, in a camera, a plurality of photographs of the same scene from accurately the same point of view at the same time, disregarding certain refinements which need not be considered in an explanation of the fundamental optical principles involved; and Figs. 7 and 8 illustrate certain symmetrical arrangements on the film of the relatively inverted pictures produced by the system in certain of its forms.

Referring now to Fig. 1, which illustrates one form, O represents the object, L the lens, and F the film. The light beam B passes through the lens and the glass prism $P^2$ to the semitransparent reflecting surface $x''$, whence one-half the light is reflected to the totally reflecting surface $x^2$, and thence out of the prism to the film, forming the image at M. The remainder of the light passes on through the surface $x''$ and the prism $P^3$ to the totally reflecting surface $y^2$, and thence out of the prism to the film, forming a second image at N, inverted with relation to the image M, (one beam having been reflected twice and the other once), so that the pictures on the film appear head to head or foot to foot.

The film having such relatively inverted pictures constitutes the subject matter of application Serial No. 415,074, filed October 6, 1920, in which the advantages of such arrangement are explained.

It is desirable that prisms $P^2$ and $P^3$ be right-angled and identical, in order that the optical paths to the two images may be equal. It is also desirable, though not essential, that they form in section an equilateral triangle,—in other words, that the angles 1, 2, and 3 be each 60°, so that the beam enters normally to the surface. If for any reason it is desired to use other angles a thin auxiliary prism may be interposed, presenting one face normally to the incident light, and having the other separated by an air-film from surface $x^2$ of prism $P^2$. This avoids the dispersion due to obliquity; but no advantages are obtained by departing from the 60° form.

The distinctive feature to be observed in the form shown in Fig. 1 is the complete geometrical symmetry of the two beams and images with respect to the semitransparent surface $x''$ after leaving it. Such surface may therefore be termed the symmetrical plane.

It is evident that much space is saved by using the surface $x^2$ of the prism $P^2$ both as a transmitting surface, when the light first enters the prism, and also as a totally reflecting surface for that part of the light reflected back by surface $x''$.

Figure 2:
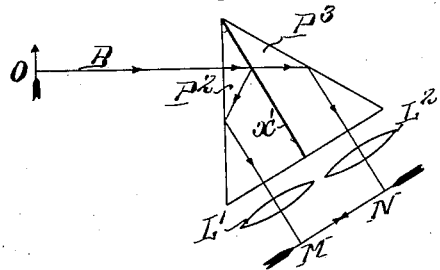

Instead of placing the symmetrical plane behind the lens, that is, between the lens and film, in which case the beam first passes through the lens and is then split to form two images, it may be placed before two or more lenses, that is, between the object and the lenses, as shown in Fig. 2, in which case the beam B is first split at the semitransparent surface $x'$ and then the two parts pass through two lenses $L'$ and $L^2$ to the two images M and N on the film. This arrangement makes the point of view of the two lenses the same, and avoids the stereoscopic effect which would result if the light passed directly from the object to the two lenses in two distinct beams. Since one beam has undergone one more reflection than the other, the images will be relatively inverted.

Figure 3:
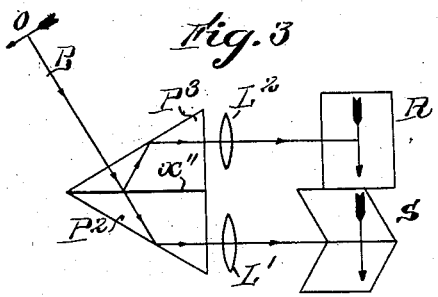
Figure 4:
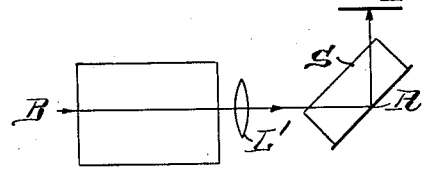

If it is desired to have the pictures similarly arranged, instead of relatively inverted, this may be accomplished by rotating one of the images by reflection in a right-angled prism, as shown in Figs. 3 and 4. This arrangement is identical with Fig. 2, with the addition of the plane reflector R and reversing reflector S. The beam passing through lens $L^2$ is reflected up at right angles to the plane of Fig. 5 by the 45° plane totally reflecting mirror or similar reflector R; while the other beam passing through lens $L^1$ is also reflected up at right angles to the plane of the drawing, but is reflected by means of a leaves-of-a-book reflector S comprising two plane reflecting surfaces at right angles to each other, which also reverses the image, or rotates it through 180°. The reflectors R and S might obviously be a totally reflecting prism and a right angle prism, but for simplicity and clearness in drawing they are shown as composed of plane mirror surfaces. The resultant images are therefore similarly arranged instead of relatively inverted. Fig. 4 shows Fig. 3 viewed from below. This inverting of one image is obviously possible with any symmetrical plane method.

Thus, in order to obtain two pictures from accurately the same point of view at the same time, a symmetrical plane may be used, consisting of a semitransparent surface placed in a position either behind the lens and essentially symmetrical with respect to the two images, or in a position in front of two lenses and essentially symmetrical with respect to them. The arrangement may be varied in several ways, but the essential condition in obtaining relatively inverted images is the presence of such symmetrical plane.

With the use of the symmetrical plane it is possible to get, in the case of one lens, two paths between the lens and the film, of essentially the same lengths; and in the case of two lenses in the two paths from the symmetrical plane to the film, the virtual images of the two lenses coincide, hence the two lenses have precisely the same viewpoint regarding the scene to be photographed. In either case the two paths of the split light beyond the symmetrical plane where the light is split, are completely symmetrical to each other and to the symmetrical plane.

With the use of the symmetrical plane systems above described, two identical, or inverted and symmetrical images may be obtained on the film at the same time from precisely the same viewpoint. Such a film with relatively inverted or foot-to-foot pictures is illustrated in Fig. 7, wherein F represents a film of usual form, and $F'$ and $F'$ a pair of foot-to-foot, simultaneously made pictures of the same scene.

Should it be desired to obtain more than two such pictures, say three or four, this can be accomplished by adding a second symmetrical plane system to the system illustrated in Fig. 1, in the manner presently to be described. This will produce a film with four pictures of the same scene (or three by merely dropping out one picture) taken at the same time, from accurately the same point of view, and arranged symmetrically with relation to two axes, one transverse and one longitudinal of the film, as illustrated in Fig. 8. In this form each picture $F'$ on the film F is symmetrically arranged and inverted with relation to the adjoining picture of the pair, whether considered lengthwise or crosswise of the film; and the four pictures are symmetrical and relatively inverted with relation to two axes.

To produce such a film as that shown in Fig. 8, having four pictures of the same scene from the same point of view taken at the same time, the system illustrated in Figs. 5 and 6 may be used, Fig. 6 being an elevation view from the right of Fig. 5. The upper part A represents the same system as Fig. 1, and will produce two images as already explained. In order to get four pictures in symmetrical positions another similar set of prisms, twice as wide, is placed at B in such position that each ray is split again in a direction at right angles to the former split produced by A. Each of the two split beams from A is again split by the semitransparent reflecting surface $x^4$, between prisms $P^4$ and $P^5$ (Fig. 5) in the same manner as already described with reference to Fig. 1, resulting in four symmetrical, relatively inverted images as shown in Fig. 8.

A feature in all of the above arrangements is exact equality between the two or more optical paths from lens to images. This is attained by complete geometrical symmetry with respect to the surface which splits the beam. This is highly advantageous as only in this way can the optical corrections for the glass be performed all at once by a single correcting device for the entire beam before the beam is plit.

An important problem solved in each of the above devices is to obtain the desired arrangement of images and the necessary equality of paths, without excessive length of path from lens to images. This restriction results from the rigid limitation imposed by practical considerations on the focal length of the lens used,—a limitation which excludes many possible arrangements because of the too great length of path they require.

It follows that, unless metal reflectors are used (which in general is not feasible), in systems involving a single lens, a large part of the path from lens to images must lie within the glass prisms used to divide and manipulate the light. It is well known in the optical art that this mass of glass (optically equivalent to a single slab in a straight beam) introduces aberrations tending to impair the good definition of the image. Chief among these are curvature of field, chromatic aberration, and spherical aberration. Means for correcting these aberrations as fully as the various conditions allow forms no part of the invention herein claimed, and are therefore not described.

In order to eliminate the problem of making such correction separately for each division of the beam, and to permit its correct accomplishment once for all at or near the lens, it is highly desirable that the part of every path from lens to image which lies in glass be made equal; that is, that each part of the beam, after division, traverse the same distance in glass. This is an important feature of all the above arrangements.

It is of great importance that the geometrically identical images before referred to should be taken on the same film and not very distant from each other. There are several reasons for this. In the first place, any film, during the mechanical and chemical processes of developing and fixing, undergoes a certain amount of change in form, principally shrinkage, and in general it cannot be assumed that two separate films will shrink to the same degree. Therefore, if the images were taken on two or more different films, they could not be relied upon to remain accurately the same in size through the process of development, printing and projecting upon the screen.

In the second place, the accurate superposition of two or more pictures on the projecting screen depends on the two or more images on the film used in projection, being either positioned to extreme accuracy or out of position by the same small amount. Actual practice proves that lack of register on the screen is more annoying than an irregular displacement of the picture as a whole, that is, of all of the two or more superimposed images to the same degree. It is therefore important that the relative position on the screen of the two or more geometrically identical images should be more accurately constant than the mere positioning of non-attached films by the mechanism of the projector can accomplish. When the two or more images are on the same film and the film is treated uniformly throughout its length, pictures on the projecting screen once in register will remain accurately in register, since the slight irregularities of the mechanism when the pictures are similarly oriented involves similar displacements for all of the superimposed screen images.

The exposures by the divided beams not only take place during the same intervals of time and are therefore concomitant but the images are focused on the films in a manner especially suited to cinematographic film production. For example, the images are formed side by side in reversed relationship about a line parallel to margins thereof with coresponding margins parallel to each other and to the center line of the film and with corresponding margins in alignment with each other. Thus in applying the invention to the production of a single width film such as shown in Fig. 7 the images F' are symmetrical about a line parallel to their head and foot margins with their foot margins side by side, the right margins, the left margins, the top margins, and the bottom margins of the respective images are parallel to each other and both the right and left margins respectively are in alignment with each other and severally parallel to the longitudinal central line of the film. In producing a multi-width film such as shown in Fig. 8 the images are symmetrically reversed about both transversal and longitudinal lines passing between the images parallel to their juxtaposed margins, corresponding margins of the images are side to side, all the corresponding margins of the respective images are parallel to each other, top and bottom margins of the respective images are in alignment longitudinally of the film, and corresponding side margins are in alignment transversely of the film.

Another characteristic of the invention peculiarly adapting it to the art of cinematography consists in that the film path bears such relation to the light dividing surface that the margins of the film path are correspondingly located relative to the side margins of the light-dividing surface. Referring to Fig. 1, for example, the near margins of the light-divider $x''$ and the film F bear the same relation to each other as the far margins of $x''$ and F, this resulting in the desirable positioning of the images above referred to.

This application is a division of Sr. No. 77,237, filed Feb. 9, 1916.

I claim:

1. The art of making cinematographic film bearing complemental images of the same object-field, comprising dividing a beam of light, acting upon the beam of light to bring images of the object field concomitantly into focus from the same point of view in respective divisions of the beam in mutually reversed relationship to each other on the same film, transmitting the respective divisions of the beam to the film through optically like paths, and successively exposing new areas of the film in the focal plane of each image.

2. The method of making a multiplex cinematographic film which comprises causing incidence of a beam of light converging to an image obliquely upon a partly reflecting and partly transmitting plane surface to form similar divided image-forming beams, transmitting the divided beams divergently along like paths symmetrical to each other relatively to the plane of the partially reflecting surface to form images in reversed relation to each other about a line parallel to margins of the images, feeding a film along a path successively intersecting said divided beams in their image planes, and simultaneously and recurrently exposing recurrent areas of the film to the divided beams respectively, thereby to form successive sets of recurrent reversed images on the film.

3. The method of making a multiplex cinematographic film which comprises causing incidence of a beam of light converging to an image obliquely upon a partly reflecting and partly transmitting plane surface to form similar divided image-forming beams, transmitting the divided beams divergently along like paths symmetrical to each other relatively to the plane of the partially reflecting surface to form images in reversed relation to each other about a line parallel to margins of the images, feeding a film along a path successively intersecting said divided beams in their image planes, and simultaneously and recurrently exposing adjacent areas of the film to the divided beams respectively, thereby to form successive sets of adjacent reversed images on the film.

4. The method of making a multiplex cinematographic film which comprises transmitting a beam of light obliquely to a partly reflecting and partly transmitting plane surface to form similar divided beams, transmitting the divided beams along like paths symmetrical to each other relatively to the plane of the partly reflecting surface, focusing the light so that the divided beams respectively form symmetrically reversed images in areas adjacent the opposite sides of said plane respectively with corresponding margins of the images in alignment, moving sections of a film through both of said areas in close succession so that new adjacent areas of the film may be exposed simultaneously to the divided beams, and recurrently effecting such simultaneous exposure of succeeding sections of the film, thereby to form successive sets of adjacent reversed images on the film.

5. The method of making a cinematographic film bearing a series of multiplex images of the same object-field comprising dividing a beam of light, acting upon the beam of light to bring images of the object-field concomitantly into focus from the same point of view in respective divisions of the beam in mutually reversed relationship to each other and side to side on the same side of the film, and successively exposing new areas of the film in the focal plane of each image.

6. The art of making cinematographic film bearing complemental images of the same object-field comprising dividing a beam of light, acting upon the beam of light to bring images of the object field concomitantly into focus from the same point of view in respective divisions of the beam in mutually reversed relationship to each other in the same plane, and successively exposing new areas of the film in the focal plane of each image.

7. The art of making cinematographic films comprising the simultaneous exposure, to a plurality of images formed in the same plane of the same object-field viewed from the same point, of different parts of the same sensitive surface lying in said plane, the images being formed through optically like paths in reverse relationship relative to a line parallel to margins of the film and being subjected severally to different color absorption.

8. The method of making a multiplex cinematographic film which comprises dividing into two similar beams at a partially transmitting and partially reflecting plane surface a beam of light converging to a focus from the same point of view, feeding a film along a path the margins of which are correspondingly located relative to the margins of said surface respectively, and simultaneously receiving the focused images in the divided beams severally on separate areas of the film there positioned symmetrically to each other and to said plane.

9. The method of making a cinematographic film bearing a series of multiplex images of the same object-field comprising dividing a beam of light at a partially transmitting and partially reflecting plane surface, acting upon the beam of light to bring images of the object-field concomitantly into focus from the same point of view in respective divisions of the beam with corresponding points of the images equidistant from said plane and with margins of the images parallel to said plane, feeding a film along a path the margins of which are disposed in planes perpendicular to said plane, and concomitantly receiving the focused images in the divided beams severally on separate areas of the film on opposite sides of the plane of said surface.

Signed by me at Boston, Massachusetts, this thirteenth day of March, 1922.

DANIEL F. COMSTOCK.